United States Patent

Yuan

Patent Number: 5,468,791
Date of Patent: Nov. 21, 1995

[54] PRIMERS CONTAINING ZIRCOALUMINATE COUPLING AGENTS FOR IMPROVED ADHESION

[75] Inventor: San C. Yuan, Farmington Hills, Mich.

[73] Assignee: E. I. Du Pont de Nemours and Company, Wilmington, Del.

[21] Appl. No.: 343,866

[22] Filed: Nov. 17, 1994

[51] Int. Cl.$^6$ .................. C08K 5/15; C08K 5/04
[52] U.S. Cl. .................. 524/108; 524/398; 428/457; 428/458; 428/480
[58] Field of Search .................. 428/457, 458, 428/480; 524/398, 108

[56] References Cited

U.S. PATENT DOCUMENTS

| | | | |
|---|---|---|---|
| 4,650,526 | 3/1987 | Claffey et al. | 148/6.14 R |
| 5,035,940 | 7/1991 | Winton et al. | 428/174 |
| 5,215,783 | 6/1993 | Harper | 427/160 |
| 5,227,201 | 7/1993 | Harper | 427/407.1 |
| 5,286,782 | 2/1994 | Lamb et al. | 524/507 |
| 5,314,945 | 5/1994 | Nickle et al. | 524/507 |

FOREIGN PATENT DOCUMENTS

1307475 of 0000 Japan .

OTHER PUBLICATIONS

L. B. Cohen, Zuircoaluminate Adhesion Promoters, *J. Adhes. Sci. Tech.*, vol. 5, No. 6, 439–48, 1991.

Rhone–Poulenc Chemicals Manchem Ltd., Application of Zircoaluminates in Coatings, *Polym. Paint Col. J.*, vol. 180, No. 4260, 312–4, 1990.

L. B. Cohen, Corrosion Reduction in High–Solids and Water–borne Coatings Using Zircoaluminate Adhesion Promoters, *Proc. 15th Water–Borne & Higher–Solids Coatings Symp. New Orleans*, 155–69, 1988.

L. B. Cohen, High–Performance Coatings: in situ Surface Modification with Zircoaluminate Metallo Organic Coupling Agents, *Pig. Resin Tech.*, vol. 17, No. 4, 10–5, 1988.

L. B. Cohen, Chemistry of Zircoaluminate Coupling Agents and Their Application in High–solids Coatings, *Proc. 13th Water–Borne & Higher–Solids Coatings Symp.*, New Orleans, 216–36, 1986.

*Primary Examiner*—Kriellion S. Morgan
*Attorney, Agent, or Firm*—Hilmar L. Fricke

[57] ABSTRACT

An improved solvent borne primer composition containing as the binder a polyester, polyester urethane or an epoxy polyester and a monomeric or polymeric alkylated melamine formaldehyde crosslinking agent and containing pigments in a pigment to binder weight ratio of about 10/100 to 200/100; where the improvement is the use of about 0.1–10% by weight, based on the weight of the binder, of a zircoaluminate coupling agent of the formula

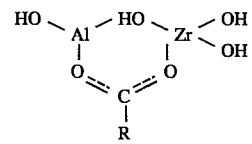

where R is an organo functional group;

wherein the primer provides excellent adhesion to water-borne basecoats that are applied over the primer.

8 Claims, No Drawings

PRIMERS CONTAINING ZIRCOALUMINATE COUPLING AGENTS FOR IMPROVED ADHESION

BACKGROUND OF THE INVENTION

This invention is directed to a primer composition containing zircoaluminate coupling agent to improve adhesion of a waterborne base coat that has been applied to a layer of the primer.

Zircoaluminate coupling agents have been used as adhesion promoters in adhesives and coatings to improve the adhesion of the adhesive or coating to metal substrates as shown in Claffey et al U.S. Pat. No. 4,650,526, issued Mar. 17, 1987 and Winton et al U.S. Pat. No. 5,035,940 issued Jul. 30, 1991.

To reduce solvent emissions, many auto and truck manufacturing plants use waterborne basecoats over high solids solvent borne primers. A clear coating usually is applied over the waterborne basecoat which can be waterborne or solvent borne clear coating. Another advantage other than reduction of solvent emissions of waterborne coatings is improved appearance particularly for metallic flake containing coatings in comparison to conventional solvent borne basecoats. However, there have been intercoat adhesion failures between the waterborne basecoats and the solvent borne primers in particular solvent borne primers of polyesters, polyester urethanes and epoxy polyesters which contain monomeric and/or polymeric melamine crosslinking agents. Monomeric melamine crosslinking agents are particularly desirable since these agents form primers that have a higher solids content and lower VOC (volatile organic content) than primers made with conventional polymeric melamine crosslinking agents.

There is a need for a low VOC primer composition that upon curing has good adhesion to the substrate to which it is applied and provides a surface to which a waterborne topcoating will have excellent adherence.

SUMMARY OF THE INVENTION

An improved solvent borne primer composition containing as the binder a polyester, polyester urethane or an epoxy polyester and a monomeric and/or polymeric alkylated melamine formaldehyde crosslinking agent and containing pigments in a pigment to binder weight ratio of about 10/100 to 200/100; where the improvement is the use of about 0.1–10% by weight, based on the weight of the binder, of a zircoaluminate coupling agent of the formula

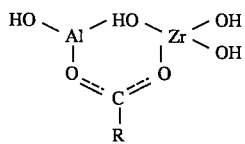

where R is an organo group;
wherein the primer provides excellent adhesion to waterborne basecoats that are applied over the primer.

DETAILED DESCRIPTION OF THE INVENTION

The novel primer composition of this invention has excellent adhesion to the substrate to which it is applied and provides a surface to which a waterborne base coat will adhere and not fail under end use conditions i.e. exposure to weathering, resistance to stone chipping and the like. Surprisingly, the addition of a zircoaluminate couple agent to the primer composition, provides a significant improvement in adhesion of a waterborne basecoat that is applied over the primer.

The primer composition has a film forming binder content of about 50–85% by weight and correspondingly contains about 15–50% by weight of a liquid carrier which generally is an organic solvent for the binder. The primer contains pigments in a pigment to binder weight ratio of about 10/100 to 200/100 and contains about 0.1–10% by weight, based on the weight of the binder, of an zircoaluminate coupling agent and preferably about 1–5% by weight of the coupling agent.

The binder of the primer contains about 50–90% by weight of a polyester, a polyester urethane or an epoxy polyester and about 10–50% by weight of a monomeric and/or polymeric alkylated melamine formaldehyde crosslinking agent having 1–4 carbon atoms in the alkyl group.

The polyester used in the primer is the esterification product of an alkylene glycol, a triol, and a dicarboxylic acid or anhydride or an ester of a dicarboxylic acid. The polyester has a number average molecular weight of about 800–10,000 and a hydroxyl no. of about 75–300 mg KOH/g polyester and an acid no. of about 2–30.

Molecular weight is determined by gel permeation chromatography using polystyrene as the standard.

The polyester is prepared by a conventional esterification process in which the components of the polyester are charged into a polymerization vessel with solvent and preferably with an esterification catalyst and heated to about 100°–200° C. for about 2–10 hours. Water is removed as it is formed in the process. Typical catalysts that can be used to form the polyester are organo tin compounds such as dibutyl tin dilaurate, dibutyl tin oxide and the like. Alkoxy titinates also are suitable catalysts.

Typical alkylene glycols or diols that can be used to form the polyester are trimethylol pentane diol, ethylene glycol, propylene glycol, butylene glycol, neopentyl glycol, 1,6 hexane diol and the like. Typical triols that can be used are trimethylol propane and trimethylol ethane. Pentaerythritol also can be used.

Aromatic dicarboxylic acids and their anhydrides that can be used are phthalic acid, phthalic anhydride, isophthalic acid, teraphthalic acid and the like.

Hydrogenated aromatic dicarboxylic acids or their anhydrides that can be used are hexahydrophthalic acid or anhydride, tetrahydrophthalic acid or anhydride.

Typical saturated aliphatic dicarboxylic acids or esters thereof that can be used are malonic acid, succinic acid, glutaric acid, adipic acid, pimelic acid, azelaic acid, sebacic acid, 1,4 cyclohexane dicarboxylic acid, 1,3 cyclohexane dicarboxylic acid, dimethyl 1,4 cyclohexane dicarboxylate and the like. Adipic acid is preferred.

The following are preferred polyesters that can be used in the primer:

10–20% by weight trimethylol propane, 20–45% by weight neopentyl glycol, 5–15% by weight adipic acid, 10–20% by weight hexahydrophthalic anhydride, 20–30% by weight tetrahydrophthalic anhydride, 0.5–2% by weight phthalic acid.

10–20% by weight trimethylol propane, 35–45% by weight neopentyl glycol, 5–15% by weight adipic acid, 20–30% by weight tetrahydrophthalic anhydride, 5–15% by weight phthalic anhydride.

10–20% by weight trimethylol propane, 35–45% by weight neopentyl glycol, 5–15% by weight adipic acid, 20–30% by weight dimethyl 1,4 cyclohexane dicarboxylate and 5–15% by weight phthalic anhydride.

5–15% by weight trimethylol propane, 35–45% by weight neopentyl glycol, 1–10% by weight adipic acid, 15–25% by weight dimethyl 1,4-cyclohexane dicarboxylate, 20–30% by weight isophthalic anhydride.

Polyester urethanes can be prepared from any of the aforementioned polyesters which are reacted with an organic polyisocyanate. Any of the conventional aromatic, aliphatic, cycloaliphatic diisocyanates and trifunctional isocyanates can be used. Typically useful diisocyanates are 1,6-hexamethlyene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyl trimethylene diisocyanate, 1,3-cyclopentylene diisocyanate, 1,4-cyclohexylene diisocyanate, 1,3-phenylene diisocyanate, 1,5-naphthalene diisocyanate, bis -(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename "Desmodur" N-3390.

Epoxy polyesters that are useful are formed by reacting any of the aforementioned polyesters with an epoxy resin. Useful epoxy resins have a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of dihydric phenols such as bisphenol A. These polyepoxides are produced by etherification of dihydric phenols with epihalohydrin or dihalohydrin such as epichlorohydrin or dichlorohydrin in the presence of alkali.

Examples of preferred commercial epoxy resins are Epon® 828, Epon® 1001, Epon® 1001F, Epon® 1002F, Epon® 1004F. Most preferred are Epon® 828 and Epon® 1001F since these resins form high quality products.

Monomeric or polymeric alkylated melamine formaldehyde crosslinking agents or any mixtures thereof used can be partially or fully alkylated with an alkanol having 1–4 carbon atoms. Preferred are monomeric alkylated melamine formaldehyde crosslinking agents that are 50% butylated and 50% methylated.

The zircoaluminate coupling agent used has the following formula

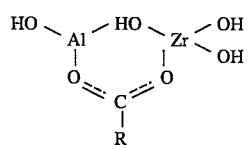

wherein R is an organo functional group.

Preferably, R is an alkane group or an alkene group having 2–20 carbon atoms. More preferably, R is $H_2N(CH_2)_2$, $H_3C(CH_2)_{12}$, $H_2N(CH_2)_4CH(NH_2)$, $HOCH_2CH(NH_2)$, or $HSCH_2CH(NH_2)$.

About 5–15% by weight, based on the weight of the binder, of an epoxy resin can be added to the primer to improve adhesion of the primer to an electrodeposited substrate that is applied to the steel or metal substrate typically used for autos and trucks. Any of the aforementioned epoxy resins can be used. One particularly preferred epoxy resin is Epon® 828. Antipoping agent and sag control agents also can be added.

Typical pigments that can be used in the primer composition are talc, hydrophobic silica, china clay, barytes, carbonates, silicates, metallic oxides such as titanium dioxide, iron oxide, zinc oxide; carbon black, zinc chromate, and some organic colored pigment such as phthalocyanine blue and green and the like.

The pigments generally are introduced into the primer composition by first forming a mill base with any of the aforementioned binders or with another polymer that is compatible with the binder or with a dispersing agent by conventional techniques such as sand grinding, ball milling, attritor grinding or two roll milling. The mill base is blended with the other constituents used to form the primer composition.

Any of the conventional solvents or blends of solvents can be used provided that the selection of solvent is such that the binder constituents are compatible and give a high quality primer. The following are example of solvents that can be used: methanol, butanol, methyl isobutyl ketone, diisobutyl ketone, methyl ethyl ketone, methyl amyl ketone, toluene, xylene, acetone, ethylene glycol monobutyl ether acetate, butyl acetate and other ester, ethers, ketone, aliphatic and aromatic hydrocarbon solvents that are conventionally used.

Catalysts can be added to aid in curing such as paratoluene sulfonic acid, dodecyl benzene sulfonic acid, dinonyl naphthalene disulfonic acid and the like. These catalysts can be blocked with agents such as dimethylethanolamine, aminomethyl propanol or dimethyloxazolidine.

The primer composition can be applied by conventional techniques such as spraying, electrostatic spraying, dipping, brushing flowcoating and the like. After application, the primer is baked at an elevated temperature of about 115°–150° C. for about 10–60 minutes to form a primer layer about 10–50 microns mils thick.

Any conventional waterborne base coats can be applied over the primer. Typically these are aqueous dispersions of an acrylic polymer and an alkylated melamine formaldehyde crosslinking agent. Useful compositions are taught in Nickle and Werner U.S. Pat. No. 5,314,945 issued May 24, 1994 which is hereby incorporated by reference. Clear coating composition that can be used are shown in Harper U.S. Pat. No. 5,215,783 issued Jun. 1, 1993, Harper U.S. Pat. No. 5,227,201 issued Jul. 13, 1993 and in Lamb and Sims U.S. Pat. No. 5,286,782 issued Feb. 15, 1994 which are all incorporated herein by reference. Other clear coats of acrylic polymers and isocyanates or melamine crosslinking agents can be used. Generally, the base coat is applied and dried for a short period and then the clear coat is applied and both the basecoat and clear coat are cured to form a finish. Typically, the basecoat and clear coat are baked at about 90°–150° C. for about 10–50 minutes to fully cure these coatings.

The following example illustrates the invention. All parts and percentages are on a weight basis unless otherwise indicated.

The following abbreviations are used in the examples
AD-adipic acid
PA-phthalic acid
NPG-neopentyl glycol
TMP-trimethylol propane
HHPA-hexahydrophthalic anhydride
THPA-tetrahydrophthalic anhydride

EXAMPLE 1

A primer composition was prepared by blending together the following ingredients in a suitable mixing vessel in the order shown:

|  | Parts by Weight |
|---|---|
| Polyester resin solution (70% solids of a polyester of TMP/NPG/AD/HHPA/THPA/PA in a weight ratio of 11/34/13/14/27/1 having a number average molecular weight of 1,600–1,700, a hydroxyl no. of 145–155 and an acid no. of 13–17 in aromatic solvent) | 994.7 |
| Monomeric fully alkylated melamine formaldehyde crosslinking agent isobutylated/methylated 50/50 ratio | 424.9 |
| White pigment dispersion (64% titanium dioxide pigment dispersed in polyester resin solution and the solvent used is a blend of butyl acetate and xylene) | 990.0 |
| Carbon black pigment dispersion (8% carbon black, polyester resin, in butyl acetate solvent) | 107.3 |
| Polyester polyol (100% solids cycloaliphatic diester diol) | 152.7 |
| Zircoaluminate coupling agent having the formula described above where R is $H_2N(CH_2)_4CH(NH_2)$ | 58.9 |
| Methanol | 55.2 |
| Diisobutyl ketone | 97.4 |
| Dibasic ester | 59.0 |
| Dodecyl benzene sulfonic acid blocked with 2-methyl-1-propanol | 45.2 |
| "Resiflow" (10% solids of polyacrylate in xylene) | 22.9 |
| Total | 3008.2 |

The resulting primer composition had a solids content of 73% solids and a viscosity of 65 seconds measured with #2 Ford cup.

An identical primer (control) was formulated as above except the zircoaluminate coupling agent was omitted. The resulting primer composition had the same solids and viscosity.

Two sets of zinc phosphate treated steel panels electrocoated with a standard isocyanate crosslinked epoxy resin electrocoating primer were sprayed; one set with the above prepared primer composition and the second set with primer (control) composition and each set baked at 140° C. for 30 minutes. The resulting primer layer was about 25 microns in thickness. Each of the panels was spray coated with a conventional pigmented waterborne basecoat composition of a hydroxy containing acrylic latex and a melamine crosslinking agent and baked at 121° C. for 30 minutes and tested for tape adhesion. Another two sets of panels were prepared as above and coated with the waterborne base coat and then top coated with a clear coating composition of an acrylic polyol containing a hydrolyzable silane functionality and a melamine crosslinking agent and baked as above and tested for chip resistance. The test results are shown in the following table:

TABLE

ADHESION TEST ASTM SAEJ400

| Primer (control)/waterborne base coat - | 100% adhesion failure |
|---|---|
| Primer (prepared above)/waterborne basecoat - | 10% adhesion failure |

CHIP RESISTANCEFEST ASTM D-3359-93

| Primer (control) waterborne base coat/clear coat | 4 |

TABLE-continued

| Primer (prepared above) waterborne base coat/clear coat | 7 |
|---|---|

Rating for chip resistance test:

| 10 | no failure |
|---|---|
| 7 | passed |
| 0 | complete failure |

I claim:

1. An improved solvent borne primer composition comprising a liquid carrier and a binder selected from the group consisting of a polyester, polyester urethane or an epoxy polyester and containing a crosslinking agent selected from the group consisting of a monomeric alkylated melamine formaldehyde crosslinking agent, a polymeric alkylated melamine formaldehyde crosslinking and any mixtures thereof and containing pigments in a pigment to binder weight ratio of about 10/100 to 200/100; where the improvement is the use of about 0.1–10% by weight, based on the weight of the binder, of a zircoaluminate coupling agent of the formula

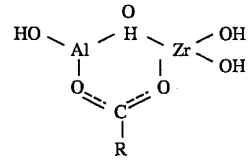

where R is selected from the group consisting of $H_2N(CH_2)_2$, $H_3C(CH_2)_{12}$, $H_2N(CH_2)_4CH(NH_2)$, $HOCH_2CH(NH_2)$ and $HSCH_2CH(NH_2)$; wherein the primer provides excellent adhesion to waterborne basecoats that are applied over the primer.

2. The improved primer composition of claim 1 in which R is $H_2N(CH_2)_4CH(NH_2)$.

3. The improved primer composition of claim 2 in which the binder is a polyester consisting of the esterification product of an alkylene glycol, triol, and dicarboxylic acid or anhydride or an ester of dicarboxylic acid, said dicarboxylic acid or anhydride being selected from the group consisting of aromatic dicarboxylic acid or anhydride, hydrogenated dicarboxylic acid or anhydride, aliphatic dicarboxylic acid and any mixtures thereof and said polyester having a number average molecular weight of about 800–10,000 and a hydroxyl number of about 75–300 and an acid number of about 2–30.

4. The improved primer composition of claim 3 in which the binder consist essentially of about 50–90% by weight, of the polyester and correspondingly about 10–50% by weight of monomeric alkylated melamine formaldehyde crosslinking agent and contains about 1–5% by weight, based on the weight of the binder, of the zircoaluminate coupling agent.

5. The improved primer composition of claim 4 in which the monomeric alkylated melamine formaldehyde crosslinking agent is 50% butylated and 50% methylated.

6. The improved primer composition of claim 1 containing 5–15% by weight, based on the weight of the binder, of an epoxy resin.

7. A substrate coated with a layer of the primer composition of claim 1.

8. The substrate of claim 7 in which the layer of the primer composition is coated with a waterborne pigmented base coating composition and the basecoating composition is coated with a layer of a clear coating composition.

* * * * *

UNITED STATES PATENT AND TRADEMARK OFFICE
CERTIFICATE OF CORRECTION

PATENT NO. : U.S. Patent 5,468,791
DATED : November 21, 1995
INVENTOR(S) : San C. Yuan It is certified that error appears in the above-indentified patent and that said Letters Patent is hereby corrected as shown below:

Claim 1. Delete the formula between lines 22 through 28 and replace with the formula as follows:

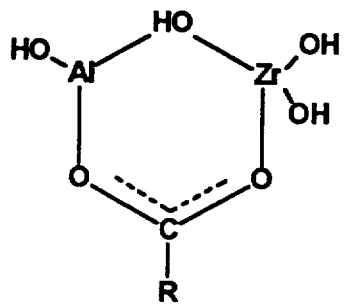

Signed and Sealed this

Eleventh Day of February, 1997

Attest:

BRUCE LEHMAN

Attesting Officer     Commissioner of Patents and Trademarks